Sept. 14, 1965  S. B. GÓMEZ  3,205,984
CONTROLLED ACTION ROTARY SERVO-MOTOR CONTROL MECHANISM
Filed Dec. 11, 1961  7 Sheets-Sheet 1
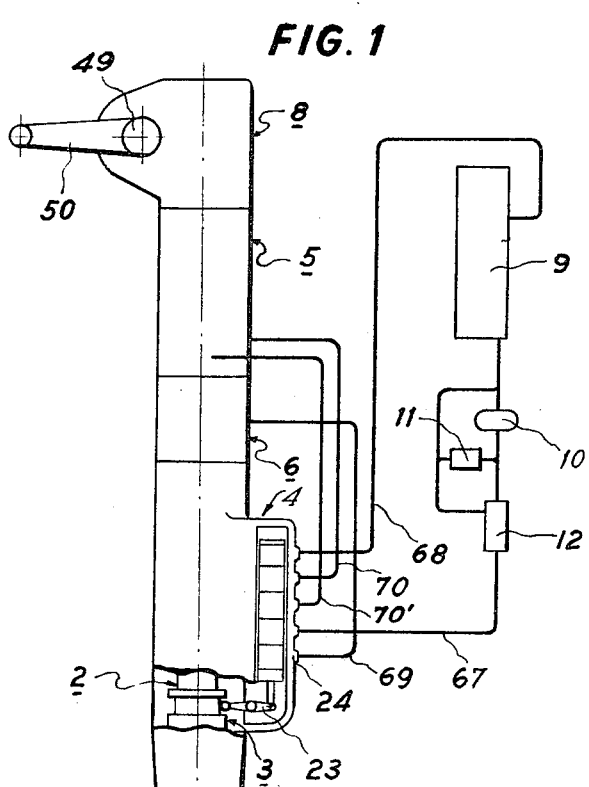
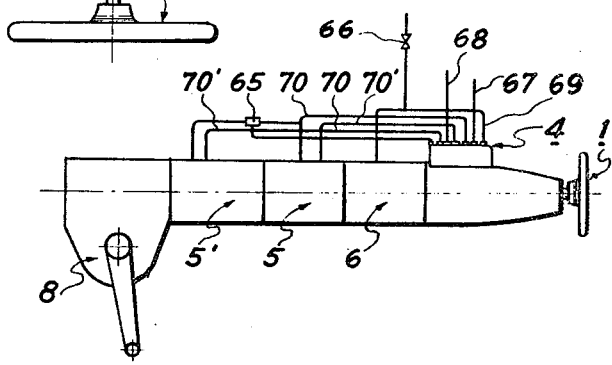

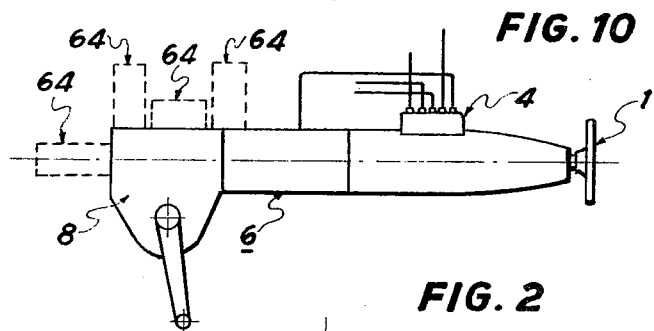
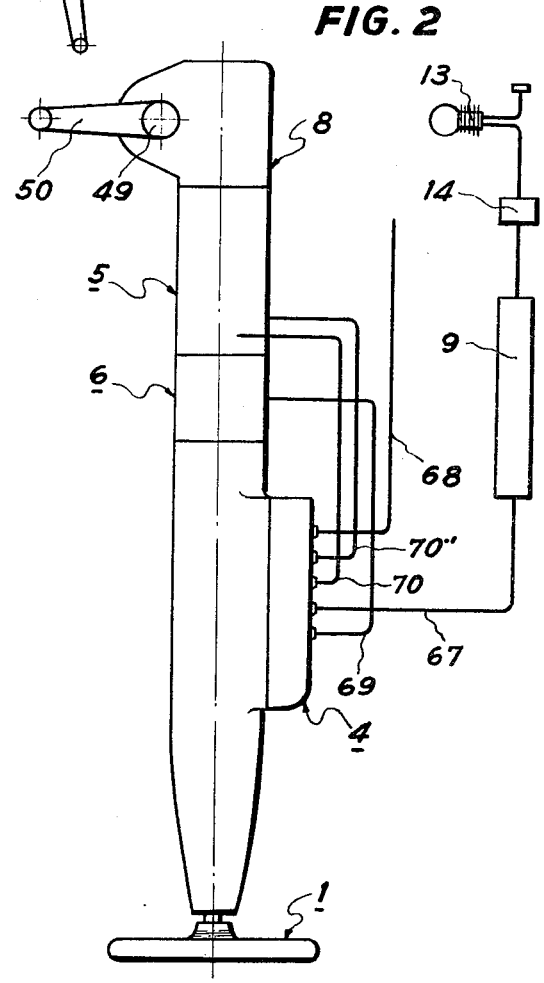

Sept. 14, 1965 S. B. GÓMEZ 3,205,984
CONTROLLED ACTION ROTARY SERVO-MOTOR CONTROL MECHANISM
Filed Dec. 11, 1961 7 Sheets-Sheet 3

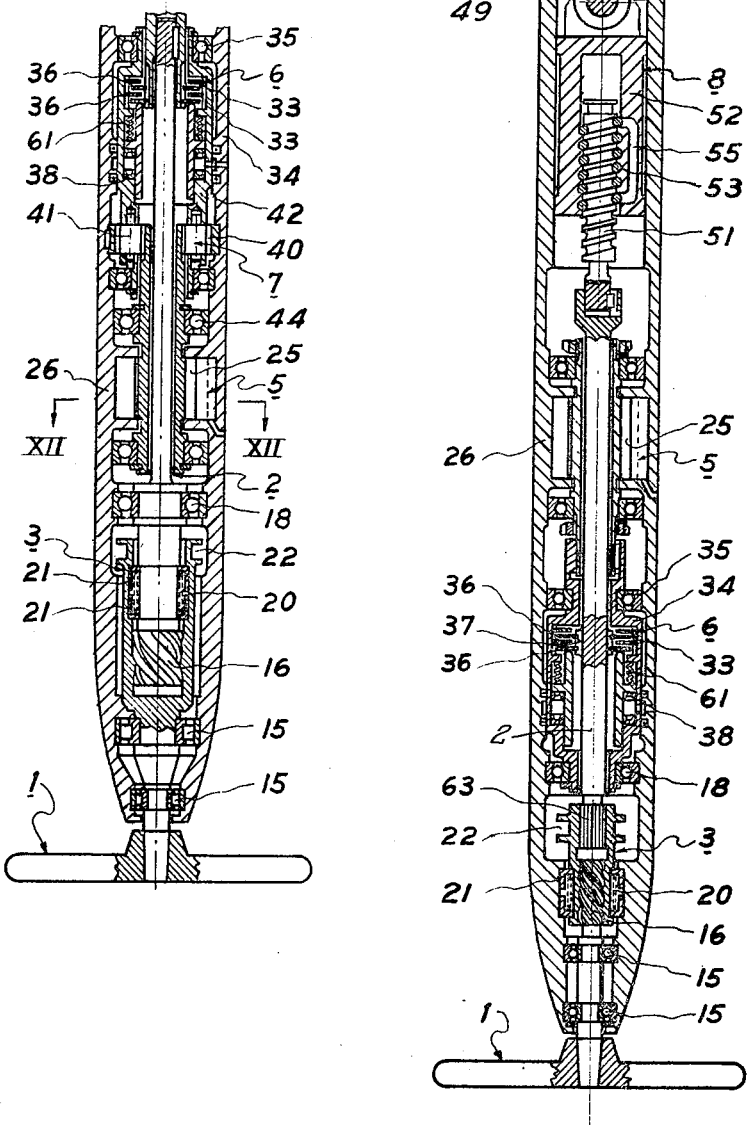

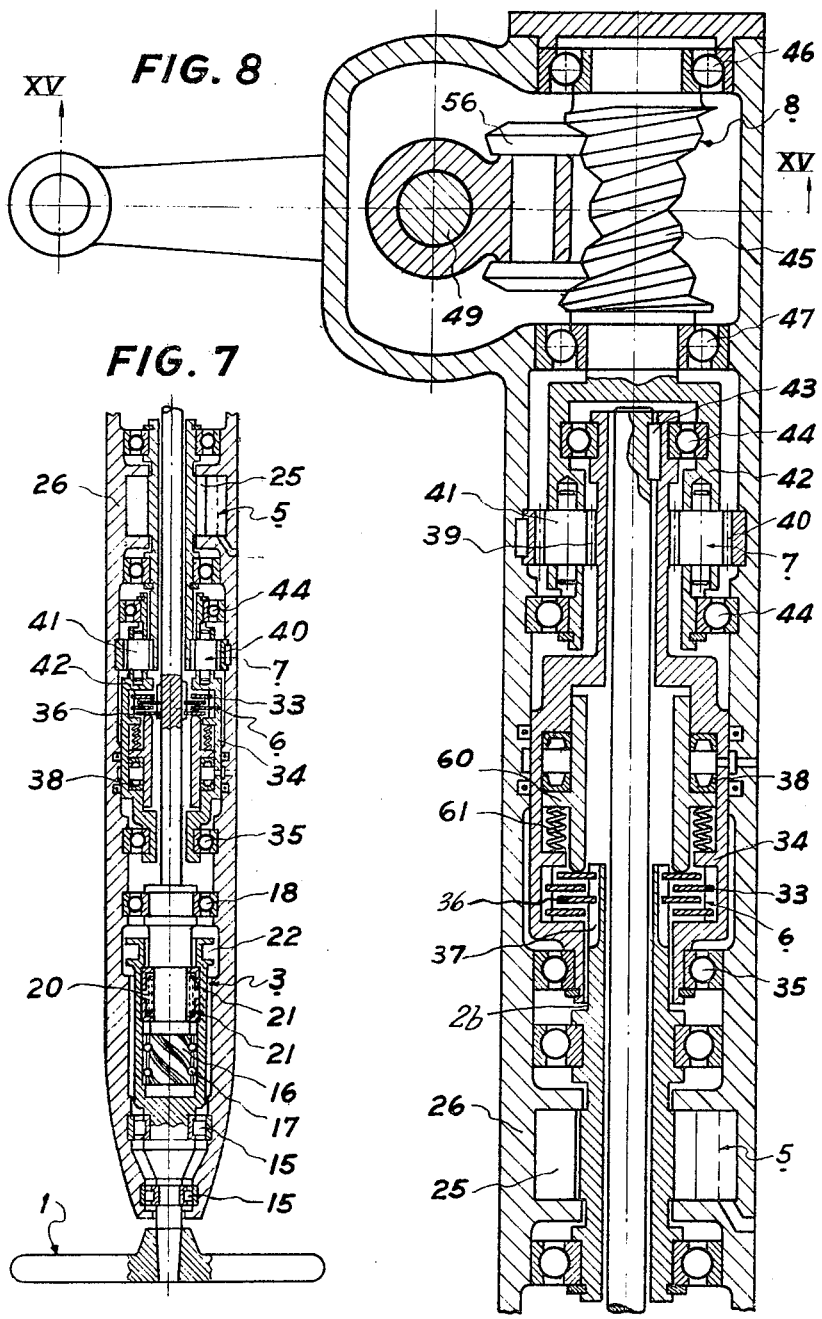

United States Patent Office 3,205,984
Patented Sept. 14, 1965

3,205,984
CONTROLLED ACTION ROTARY SERVO-MOTOR
CONTROL MECHANISM
Salvador Báguena Gómez, Rambla de la Montana 22,
Barcelona, Spain
Filed Dec. 11, 1961, Ser. No. 158,360
Claims priority, application Spain, Dec. 21, 1960, 263,475
5 Claims. (Cl. 192—.096)

This invention relates to a controlled action rotary servo-motor control mechanism.

Most of the control systems provided in motor vehicles, aircraft, ships and so on have servo-controls so that when an appropriate manual force is applied to a steering wheel, control lever or the like, it is possible to overcome the considerable resistance which opposes the change of plane of the steerable wheels of motor vehicles and motor trucks, of ship rudders, and of aircraft rudders and elevators and undercarriage wheels.

Most of the conventional servo-control systems are designed to operate immediately when the steering wheel or control lever is operated, with the result that, if the resistance to be overcome is very small and the pressure of the driving fluid is constant and relatively high, very little manual force may be required and the sensation of control is lost.

It is an object of the present invention to provide a servo motor type control mechanism of use in light and heavy vehicles and readily fitable to the steering systems of existing vehicles, and to obviate the disadvantage just outlined.

According to the present invention, the manual force applied to the control system is transmitted directly to the steering mechanism provided such force does not reach a desired lower critical value, but once such force exceeds such value, a static resistance is overcome and control valves are operated automatically, such control valves controlling the operation of the servo-motor and of the steering mechanism.

The manual force which is applied leads to the rotation of a transmission shaft associated with the steering mechanism, some of the manual force being converted into an axial component which, overcoming the aforesaid static resistance, moves a sleeve coaxial with the transmission shaft, such sleeve being connected to the control valves through a set of levers.

The servo-motor system controlled by the corresponding set of valves may be so arranged as to operate only when the shifting sleeve has reached its end position.

The servo-motor system may be operated through the agency of a pressure fluid controlled by the control valves, and the rotation of the servo-motor may be transmitted to the transmission shaft through a clutch controlled by another control valve operated by the shifting sleeve. The pressure fluid which operates the servo-motor may be a liquid or gas, mineral oil being a preferred liquid and compressed air being a preferred gas.

The clutch device may be disposed coaxially of the transmission shaft, and the location of the clutch device relative to the various elements may be as follows:

The clutch device may be disposed between the sleeve which operates the control valves and the servo-motor, the same also being disposed coaxially of the transmission shaft:

The clutch device may be disposed between the servo-motor and the steering mechanism or on the steering mechanism.

Similarly, the control valves may be fitted between the servo-motor and the manual control device, in the form of a handwheel or levers or the like, and operate simultaneously upon the servo-motor and upon the clutch device.

If the clutch device is of the friction kind, the clutch-operating valve acts progressively at different speeds depending upon whether the clutch is being engaged or disengaged, the last-mentioned valve supplying the clutch with pressure fluid for engagement, and interrupting the flow of pressure fluid for disengagement. During engagement the corresponding valve acts progressively more slowly than during disengagement.

The clutch device may also be manually operated for rapid return to its initial position completely independent of the steering wheel or control lever.

In order that the servo-motor may operate at high speed relative to the transmission shaft, with a resultant decrease in servo-motor dimensions and in clutch dimensions, a preferable geared reducer is provided between the servo-motor and the transmission shaft. The arrangement of these elements relative to the steering mechanism may be as follows:

The rotary servo-motor, with the clutch and reducer may be so disposed as to transmit its movement to the transmission shaft at any angle through the appropriate mechanical transmission.

The rotary servo-motor, with the clutch and reducer, may transmit its movement directly to the steering mechanism at any angle through a mechanical transmission.

The servo-motor with the clutch and reducer, may be disposed parallel with the transmission shaft and transmit its movement thereto through a mechanical transmission having parallel primary and output shafts.

The servo-motor assembly may act directly upon the reducer elements of the steering mechanism.

The servo-motor assembly may act directly on that part of the steering mechanism which is connected to the transmission shaft.

The servo-motor assembly may act directly upon the part of the steering mechanism which is opposite to the part directly connected to the transmission shaft.

The rotary servo-motor may act directly upon the output shaft of the steering mechanism assembly or act upon the last-mentioned shaft through a clutch device and reducer.

A number of servo-motors may be provided which are controlled by the same shiftable sleeve and which are adapted to be started progressively in dependence upon the working pressure in each such motor, the attainment of the working pressure in one servo-motor causing the next to start, and so on.

The invention is illustrated by way of example in the accompanying drawings in which:

FIG. 1 diagrammatically illustrates a control mechanism according to the invention comprising a liquid-operated servo-motor, the view being in partial section in order that the arrangement of the valves may be seen more clearly;

FIG. 2 is a diagrammatic view of the system shown in FIG. 1 but arranged for compressed air operation;

FIG. 5 is a longitudinal sectional view of a control mechanism in which the clutch device operates directly on the transmission shaft;

FIG. 6 is a partial longitudinal section through a control mechanism according to the invention in which a reducer is provided between the servo-motor and the clutch device and the same is directly coupled with the steering mechanism;

FIG. 7 is a partial longitudinal section through a control mechanism in which the clutch device acts upon the transmission shaft;

FIG. 8 is a partial longitudinal section through a control mechanism comprising a servo-motor, reducer and clutch, the reducer being directly operative upon the steering-gear worm;

FIG. 10 is a diagrammatic external view of a control mechanism according to the invention wherein the servo-motor, the clutch device and possibly the reducer are not necessarily coaxial of the transmission shaft, the dashed lines denoting a number of possible non-coaxial positions;

FIG. 11 is a diagrammatic outside view of a control mechanism according to the invention comprising two servo-motors for progressive starting;

Figure 4:
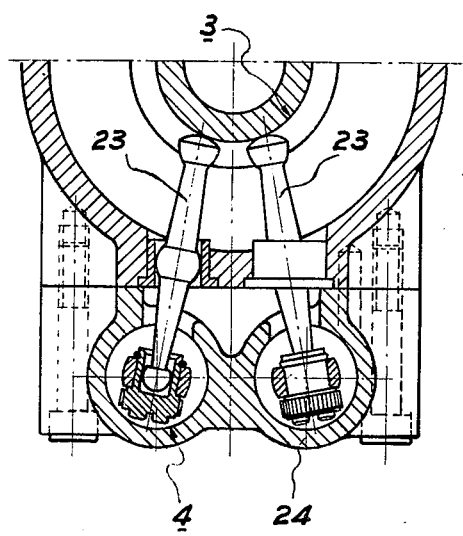
FIG. 4 is a partial section, taken along the line IV—IV of FIG. 3, showing the connection between the shiftable sleeve and the distributing valves.

Referring to the drawings, the mechanism comprises a steering wheel 1, a transmission shaft 2, a shiftable sleeve 3, a distributing valve unit 4, a servo-motor 5, a clutch 6, a geared reducer 7, a steering gear 8 and a pressure fluid reservoir 9. If the pressure fluid is a liquid, its pressure is increased by a pump 10 operative in a circuit comprising a safety valve 11 and a shut off valve 12; if the fluid is a gas, for instance, air, pressure is increased by means of a compressor 13, and safety and supervisory means 14, in the form of safety valves, a pressure gauge, a thermometer and so on, are provided between the compressor 13 and reservoir 9.

Figure 3:
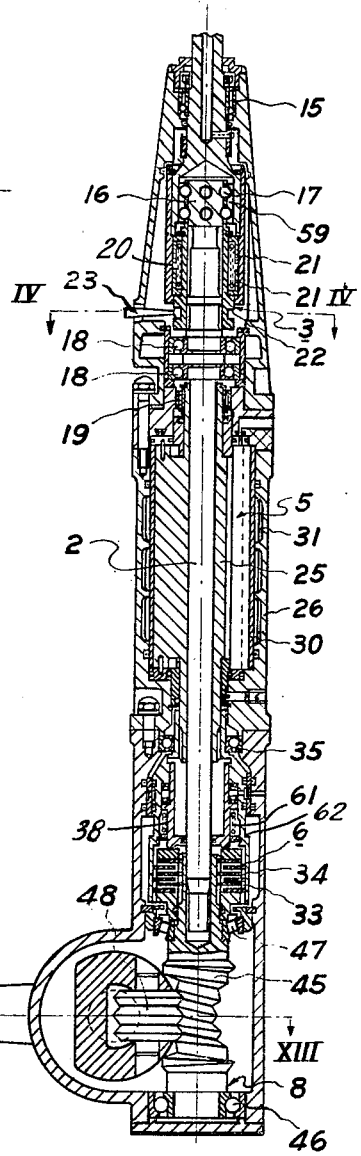
FIG. 3 is a longitudinal section through a control mechanism according to the invention coupled with a worm steering gear, the clutch device operating directly on the worm.

The steering wheel 1 is mounted on ball or roller or needle bearings 15 and is coupled with the shaft 2 through the agency of a helical screwthread 16 either by direct contact between the two parts, as shown in FIGS. 5 and 6 or through the agency of steel balls 17, as shown in FIGS. 3 and 7. The shaft 2, the geometric axis of which is an extension of the geometric axis of the steering wheel 1, is borne by ball or roller bearings 18, which prevent axial movement of the shaft 2, and possibly by needle bearings 19 (see FIG. 3) relatively to the shiftable sleeve 3, so that there can be relative radial and axial movement between the shaft 2 and the sleeve 3. The shiftable sleeve 3, which is readily visible in FIG. 3, is disposed coaxially of and outside the shaft 2 and is associated with the steering wheel 1 and shaft 2 by receiving some of the steel balls 17 or by direct engagement with the screwthread 16. In the example shown in FIGS. 6 and 7, the sleeve 3 forms an extension of the steering wheel 1 and is movable jointly therewith. The bearings 15 in FIGS. 6 and 7 are roller bearings as shown in the drawings (and not ball bearings as in the other embodiment). Therefore they do not prevent slight axial movement (of a few mm.) of the steering wheel 1 and sleeve 3. For the sleeve 3 to be moved axially, the axial component must overcome the force of a helical compression spring 20 received between two concentric tubular members 21 disposed inside the sleeve 3. That end of the sleeve 3 which is remote from the steering wheel 1 is formed with a groove 22 receiving the ends of levers 23, visible in FIG. 4, the other ends of the levers 23 being operative upon the distributing valves 4. The slight movement of sleeve 3 is sufficient to cause operation of levers 23.

The valves 4 are cylindrical and each is moved axially in a casing 24 through the agency of the levers 23. The levers 23 are connected to the sleeve 3 and to the valves 4 by way of swivel joints as can be seen in FIG. 4.

Figure 9:
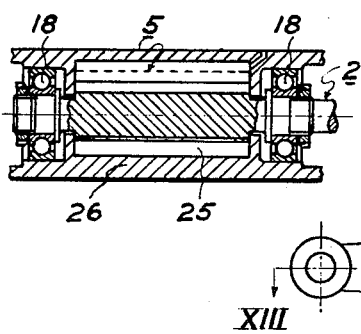
FIG. 9 is a partial longitudinal section through a control mechanism in which the servo-motor is directly coupled with the transmission shaft.
Figure 12:
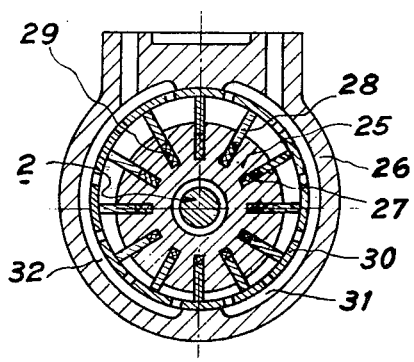
FIG. 12 is a cross-section through the servo-motor, taken along the line XII—XII of FIG. 6, and FIGS. 13–15 are sectional views, taken along the lines XIII—XIII, XIV—XIV and XV—XV respectively, of FIGS. 3, 5 and 8 respectively.

The servo-motor 5 as can be seen in FIG. 12 comprises a rotor 25 which is eccentric of a casing 26 which is formed with a number of radial grooves 27 each receiving vanes 28, the same being continuously urged radially by respective springs 29 which react against the base of the grooves 27. In the casing 26 is a jacket 30 which divides the casing 26 into two chambers 31, 32, one such chamber receiving pressure fluid and the other such chamber serving for the removal thereof. The rotor 25 can be directly coupled with the shaft 2, as shown in FIG. 9, in which event no clutch is provided; alternatively, and as shown in all the other embodiments, the rotor 25 is coupled with the shaft 2 or steering mechanism 8 through a clutch 6 and, if required, a geared reducer 7.

The clutch 6 best illustrated in FIG. 8 is of the dry friction plate kind; half the plates, 33, are rigidly connected radially to the casing 34 borne by radial bearings 35 and connected to planetary reducer 7. The other half of the clutch plates, 36, are received in a recess 37 in hollow transmission shaft 26 of the motor 5 and, like the plates 33 in the casing 34, are slidable axially in dependence upon the expanding action developed by a spring biased sleeve 38 when the same receives the action of the pressure fluid.

Figure 13:
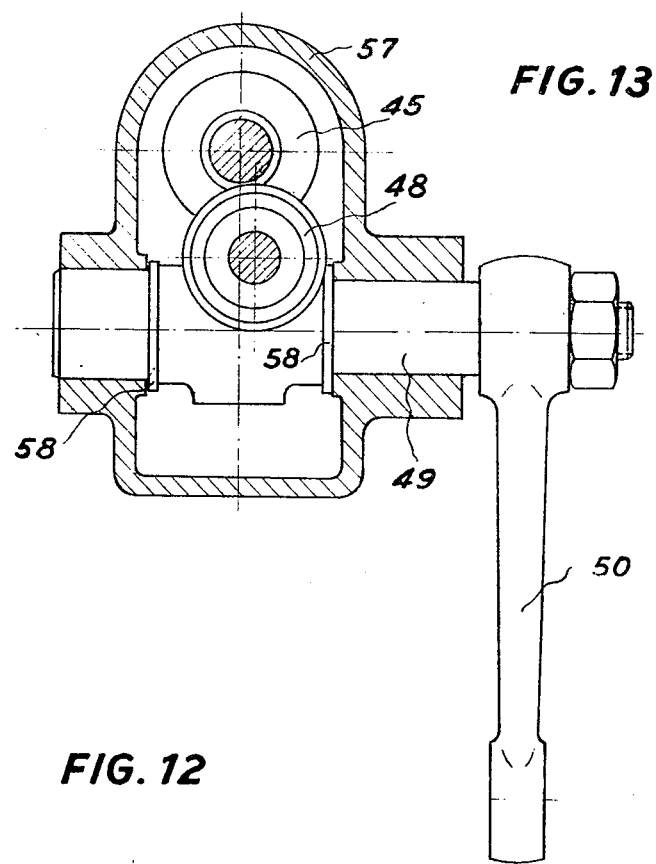
Figures 14, 15:
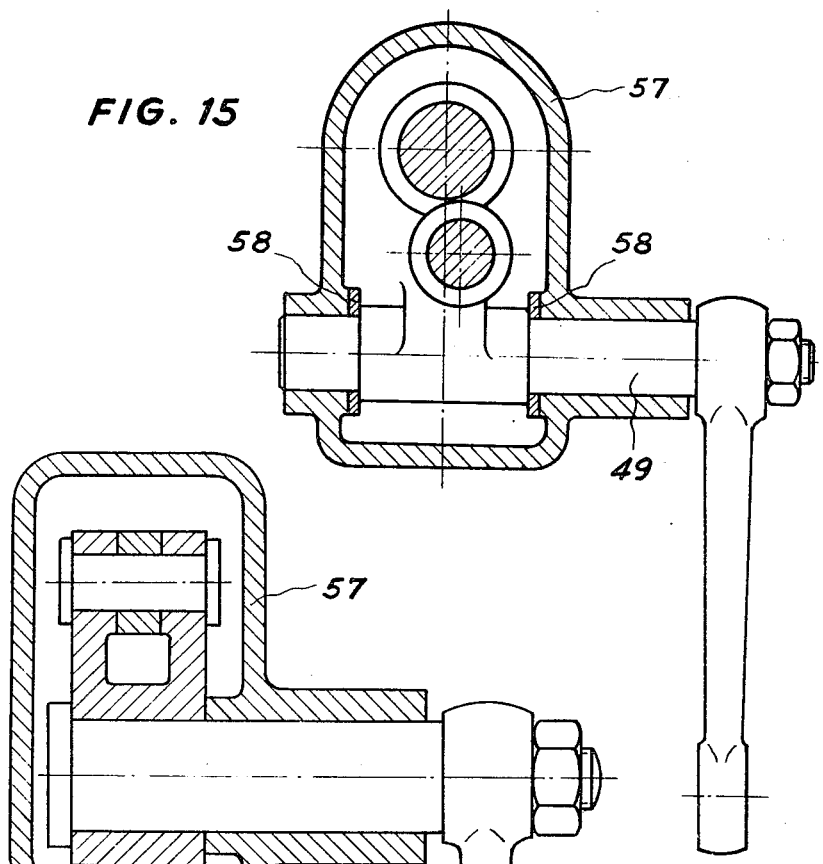

In the examples, the geared reducer 7 best illustrated in FIG. 8 is of the planetary gearing kind as being the best type to provide large reductions, to be small in size, and to have a completely cylindrical external shape; the reducer comprises a planet gear 39 driven by the servo-motor 5, a stationary ring 40 and a number of satellites 41 rotatable around a hollow cylinder 42 connected to the shaft 2—connected to the clutch casing 34 by means of a key 43—or to the steering gear 8, and rotatable on ball or roller bearings 44. Any kind of steering gear 8 can be used with the control mechanism according to the invention, and some of the main types have been shown in the drawings. In FIG. 3 the steering mechanism 8 takes the form of a curved worm 45 which is rotatable on a ball bearing 46 and on a roller bearing 47 and which drives another worm 48 articulated at right-angles to a shaft 49 to which a steering arm 50 is fitted. In FIG. 5, the steering mechanism comprises a screw 51; between the helical screwthread thereof and the helical screwthread of a nut 52 are placed steel balls 53, the nut 52 operating a lever 54 coupled to the shaft 49 for the arm 50. The nut 52 is formed with a return groove 55 for the balls 53. The steering mechanism shown in FIG. 8 comprises, as in FIG. 3, an hour-glass or waited worm 45 which acts on two rollers 56 connected to the steering arm 50 similarly to the worm 48 of FIG. 3. The shafts 49 of the steering gears 8 shown in FIGS. 3 and 8 are provided, where they engage with casing 57, with adjusting shims 58 which can be replaced by shims 58 of a different thickness to compensate for any wear which may have occurred between the contacting elements (see FIGS. 13 and 15).

On the basis of the general features hereinbefore described, the devices illustrated in the drawings operate as follows:

Referring to the example shown in FIG. 3, two cases can be distinguished when the steering wheel 1 is operated. In the first case, the force to be overcome develops an axial component operative on the sleeve 3, such component being insufficient to compress the spring 20, so that the sleeve 3 does not move and the shaft 2 rotates, the rotation being transmitted to the steering gear 8 wihou operation of the srevo-motor 5.

In the second case, if the force to be overcome developes an axial component greater than the compression of the spring 20, the shaft 2 does not rotate and, since there is relative rotation between the steering wheel 1 and the shaft 2, the balls 17 are forced to move axially in the longitudinal grooves 59 of the steering wheel 1, moving the sleeve 3 with them and therefore operating the levers 23 and valves 4. When the sleeve 3 reaches the end of its travel—i.e. when the two tubular members 21 have engaged with one another—the control valves 4 allow pressure fluid to flow to the chamber 31 of the servo-motor 5 and to the expansion sleeve 38, the servo-motor 5 therefore starting and the clutch 6 being engaged by pressure applied to its plate sets 33 and 36, since the sleeve 38 expands laterally, moving a thrust cylinder 60, as it overcomes the force of a return spring 61 which reacts on an inner disc 62 secured to the cylinder 34. Thereafter the shaft 2 is operated simultaneously by the steering wheel 1—the sleeve 3 now being unable to move axially—and by the servo-motor 5, such rotation being transmitted to the worm 45 and therefore to the steering arm 50.

The foregoing description has made no reference to the direction in which the steering wheel 1 is turned for this does not affect operation of the mechanism, rotation of the steering wheel to the opposite hand leading to reversal of the direction of movement of the levers 23 and control valves 4 which are so arranged that they reverse the supply of pressure fluid to the chambers 31 and 32 of the servo-motor 5, the chamber 31, which was previously a receiving chamber, becoming an outlet chamber and vice versa, so that the direction to which the servo-motor 5 rotates is reversed. The liquid flow passages are of a size and design such that they offer less resistance to fluid flow in the returning stage, so that the rate of return is greater than the rate of starting and engagement.

The mechanism shown in FIG. 5 has operating features which are very similar to the features just described, the only difference being that the coupling between the steering wheel 1 and the shaft 2 is by way of the sleeve 3 which is connected to the shaft 2 by means of the longitudinal groove 63; also, the steering gear 8 is of the worm and nut kind instead of the double worm kind, while the clutch 6 is connected to the shaft 2 instead of to the steering gear 8.

The examples illustrated in FIGS. 6 and 7 have displaceable steering wheels 1, so that the servo-motor 5 is started as follows:

When the steering wheel is turned in one direction, if the axial component of the force to be overcome is less than the assembly compression of the spring 20 the steering wheel 1 and the shaft 2 rotate solidly with one another, as hereinbefore described; however, if the last mentioned component overcomes the force of the spring 20, the shaft 2 does not rotate nor can it move axially as does the steering wheel 1, since such displacement is compatible with the presence of the roller bearings 15 on which it rotates. In its movement the steering wheel 1 moves with it the sleeve 3 to which it is rigidly secured, as can be seen in the drawings, and therefore moves the levers 23 to initiate the process hereinbefore described. The embodiments shown in FIGS. 6 and 7 have planetary reducers 7 so that in this case the servo-motor 5 rotates at an angular velocity greater than that of the shaft 2, with the result that the dimensions of the servo-motor 5 can be reduced. In the example shown in FIG. 6, the reducer 7 is interposed between the servo-motor 5 and the clutch 6, while in FIG. 7 the reducer 7 follows the clutch 6 so that the same also rotates faster than the shaft 2 and can therefore be smaller than in FIG. 6.

The explanations of the operation of the devices shown in FIGS. 6 and 7 also apply to the examples shown in FIGS. 8 and 9, for the only difference between the device shown in FIG. 8 and the device just described is that the reducer 7 acts directly on the steering gear 8; for the rest, its other operative characteristics are as for the previous embodiments.

The example shown in FIG. 9 has a number of major differences from the example shown in FIG. 8, arising out of constructional simplification, for since there is no clutch 6 nor reducer 7, the servo-motor rotor 25 is directly coupled with the shaft 2; however, as will be readily apparent, the phase of starting the servo-motor 5 through the agency of the control valves 4 is identical to the corresponding phase in the devices hereinbefore described.

The various examples shown in FIG. 10, where the assembly formed by the servo-motor, clutch 6 and, where applicable, the reducer, is arranged as a block 64 outside the casing 6, do not differ from the embodiment hereinbefore described so far as operation is concerned but have merely organic differences, since they require spiral or bevel gear transmissions for their assembly. The blocks 64 show possible positions of the servo motor and/or reducer.

Referring to FIG. 11, there is diagrammatically illustrated a control mechanism comprising two servo-motors 5, 5', the second of which operates after the first has come into operation when the return fluid from the first servo-motor 5 operates a valve 65 which allows the pressure fluid to flow from the valves 4 to the chambers of the servo-motor 5'.

For rapid return of the coupling 5, there is provided and diagrammatically illustrated in FIG. 10 a return to the tank 9 through a manually controlled valve 66.

All the foregoing is equally operative whether the operative fluid is in liquid or gas form, the organic differences residing in the elements mentioned at the beginning of the description of the drawings, since the fluid circuit is formed by the same receiving tube 67, outlet tube 68 and distributing tube to the clutch 6 and servo-motor 5, 69 and 70 and 70' respectively.

What I claim is:

1. A controlled action servo-motor control mechanism, comprising in combination; a steering mechanism, a servo-motor, a transmission shaft for transmitting power from the servo-motor to the steering mechanism and being operatively connected to the steering mechanism, means for supplying pressurized fluid to the servo-motor, control valves for controlling the admission of the pressurized fluid to the servo-motor, a sleeve axially shiftable on the transmission shaft adapted to operate the control valves, a clutch interposed between the servo-motor and the portion of the transmission shaft which is connected to the steering mechanism, a movable member positioned to selectively operate the clutch under the action of fluid pressure, and a spring normally biasing the movable member in a direction of disengaging the clutch when no fluid pressure is applied.

2. A controlled action rotary servo-motor control mechanism as defined in claim 1, in which the servo-motor is a rotary servo-motor and the clutch is a plate clutch, both the rotary servo-motor and the plate clutch being disposed coaxially with respect to the transmission shaft and further comprising a common casing surrounding the rotary servo-motor, plate clutch, sleeve and transmission shaft.

3. A controlled action rotary servo-motor control mechanism as defined in claim 1 further comprising gear reducer means of the planetary type interposed between the servo-motor and the portion of the transmission shaft connected to the steering mechanism.

4. A controlled action rotary servo-motor control mechanism for a steering mechanism comprising; a transmission shaft upwardly connected to the steering mechanism for transmitting power thereto, a sleeve surrounding the transmission shaft, levers positioned to operate on slidable movement of the sleeve, control valves controlled by movement of the levers, a source of pressurized fluid, a spring bias fluid operated clutch coaxial with the transmission shaft, a rotary servo-motor, the clutch being interposed between the servo-motor and the portion of the transmission shaft upwardly connected to the steering mechanism, the control valves controlling the admission of fluid pressure to the clutch and the rotary servo-motor upon sliding movement of the sleeve, and means for causing sliding movement of the sleeve upon a predetermined force being applied to the transmission shaft.

5. A controlled action rotary servo-motor control mechanism as defined in claim 4 further comprising a planetary gear reducer positioned between the rotary servo-motor and the transmission shaft so that the servo-motor runs at a different speed from the transmission shaft.

References Cited by the Examiner
UNITED STATES PATENTS

| | | |
|---|---|---|
| 1,365,347 | 1/21 | Schneider. |
| 1,944,999 | 1/34 | Rayburn. |
| 2,031,828 | 2/36 | Garrison. |
| 2,385,351 | 9/45 | Davidsen. |
| 2,661,723 | 12/53 | Johnson. |
| 2,740,507 | 4/56 | Shaff _____ 192—034 |
| 2,930,358 | 3/60 | Folkerts _____ 121—38 X |
| 2,964,017 | 12/60 | Hruska _____ 121—38 X |

DAVID J. WILLIAMOWSKY, *Primary Examiner.*

KARL J. ALBRECHT, *Examiner.*